United States Patent [19]

Takekado

[11] Patent Number: 4,876,623
[45] Date of Patent: Oct. 24, 1989

[54] MAGNETIC DISC DEVICE WITH GIMBAL SPRING HAVING VARIABLE ELASTIC CHARACTERISTICS

[75] Inventor: Shigeru Takekado, Tokyo, Japan

[73] Assignee: Kabushiki Kaisha Toshiba, Kanagawa, Japan

[21] Appl. No.: 103,017

[22] Filed: Sep. 30, 1987

[30] Foreign Application Priority Data

Sep. 30, 1986 [JP] Japan .................... 61-231762

[51] Int. Cl.$^4$ ............................................. G11B 5/48
[52] U.S. Cl. ............................................. 360/104; 360/105
[58] Field of Search ............... 360/103, 104, 105, 110

[56] References Cited

U.S. PATENT DOCUMENTS

| | | | |
|---|---|---|---|
| 3,581,298 | 5/1971 | Billawala | 360/103 |
| 3,593,326 | 7/1971 | Turner | 360/103 |
| 4,151,573 | 4/1979 | Tandon et al. | 360/104 |
| 4,306,258 | 12/1981 | Higashiyama et al. | 360/99 |
| 4,740,854 | 4/1988 | Shibuya et al. | 360/104 |

FOREIGN PATENT DOCUMENTS

| | | | |
|---|---|---|---|
| 0054069 | 3/1984 | Japan | 360/104 |
| 0187163 | 8/1986 | Japan | 360/104 |
| 0192067 | 8/1986 | Japan | 360/104 |

*Primary Examiner*—Stuart N. Hecker
*Assistant Examiner*—David J. Severin
*Attorney, Agent, or Firm*—Finnegan, Henderson, Farabow, Garrett & Dunner

[57] ABSTRACT

A magnetic disc device for recording and reproducing data on a magnetic disc comprising a magnetic head for contacting the disc and for reading and writing data on the disc. A spindle for rotatably supporting the disc for contact with the head are provided. Further, the present invention includes a gimbal plate flexibly supporting the head for compensating for variations in the thickness of the disc and variations the surface level of the disc. The gimbal plate includes links for varying the elasticity of the gimbal plate between at least two directions. There are at least four links located in one direction for reducing stress on the gimbal plate and increasing the allowable degree of variation in elasticity between the two directions.

6 Claims, 3 Drawing Sheets

MAGNETIC DISC DEVICE WITH GIMBAL SPRING HAVING VARIABLE ELASTIC CHARACTERISTICS

BACKGROUND OF THE INVENTION

1. Field of the Invention

The present invention relates to a magnetic disc device which employs a flexible magnetic disc as a recording medium, and more particularly, to a magnetic disc device for double-sided media.

2. Description of the Prior Art

Heretofore, for magnetic disc devices of this kind use has been made widely of a system in which one magnetic head unit is held fixed, and the other magnetic head unit is movably supported in a direction perpendicular to the plane of the magnetic disc and in two directions of rotation, namely, the rotational direction and the radial direction of the magnetic disc (see, U.S. Pat. No. 4,151,573).

This structure makes the positioning of the magnetic head easy. However, the magnetic disc bends to follow the shape of the magnetic head so that if the rigidity of the magnetic disc is high, the disc appears wavy and the magnetic head tends to stay away from portions of the magnetic disc, without being able to make contact with the entire disc. Therefore, such a system can be used only where the rigidity of the magnetic disc is sufficiently low. Further, the fact that the magnetic disc has to be bent to follow the magnetic head gives rise to a drawback in that the durability of the magnetic disc is reduced.

Moreover, this system has another disadvantage, for instance, in that the positional relationship between the magnetic disc and the fixed magnetic head has to be controlled with high accuracy.

A device has been proposed in which both of the magnetic heads are movably supported in three directions of up-down, rolling, and pitching (see, U.S. Pat. No. 4,306,258). In such a structure, flexibility in three directions is provided by a sheet of gimbal plate, but the gimbal plate cannot be made too hard or it may break due to plastic deformation. Moreover, if the elasticity in the two directions of rotation is too large, the two magnetic heads must be accurately maintained parallel to one another, otherwise, the pressing load forcing the two magnetic heads against the magnetic disc, which are tilted due to mounting errors, must be increased in order to maintain a close contact between the heads and the disc. As a result, this can lead to a reduction in productivity and deterioration in the durability of the magnetic disc.

Magnetic discs with increased memory capacity and smaller diameter have been used more widely in recent years. A reduction in the magnetic disc diameter results in an increase in its rigidity. This leads to difficulties in bringing the magnetic disc into continuous contact with the magnetic head, if the method of supporting the magnetic head described above is employed. Therefore, it is necessary to improve the planar accuracy of the magnetic disc, improve the vertical accuracy in attaching the magnetic head, or increase the pressing load on the head. Because of this, problems, such as a degradation of durability of the magnetic disc and degradation of productivity, have arisen. These problems become more pronounced when the rotational rigidity of the magnetic disc is greater than necessary.

As discussed above, the requirement for reducing the elasticity of the magnetic disc in the direction perpendicular to the plane of the magnetic disc has not been met sufficiently in the prior-art supporting method.

In addition, applicant has found that it is necessary to optimize the elasticity in the respective directions of rolling and pitching of the gimbal plate. More specifically, it has been found that it is desirable to increase the elasticity in the rolling direction. Also, when the recording density of the magnetic disc is increased, it desirable to increase the elasticity in the pitching direction in order to decrease the deviation of the head in the azimuthal direction. However, existing magnetic disc devices have similar structures in the rolling direction and in the pitching direction of the gimbal plate, so that the elasticities in the rolling and pitching directions are approximately equal. Consequently, due to the fact that the gimbal plate in the existing magnetic disc devices must be dictated by the larger of the elasticities in the rolling and pitching directions, it is difficult to precisely control the elasticity both in the rolling direction and in the pitching direction.

SUMMARY OF THE INVENTION

Accordingly, a primary object of the present invention is to provide a magnetic recording device for double-sided media which enables better control of the rigidity of the gimbal plate in both the rolling and pitching directions and achieves a satisfactory contact (head contact) between the magnetic head and the magnetic disc regardless of the magnitude of the rigidity of the magnetic disc, and moreover, to contribute to improved durability of the magnetic disc.

Additional objects and advantages will be obvious from the description which follows, or may be learned by practice of the invention.

In order to achieve the above objects, the magnetic recording device for double-sided media of the present invention comprises a magnetic head for contacting the disc and for reading and writing data on the disc; means for rotatably supporting the disc for contact with the head; and gimbal plate means flexibly supporting the head for compensating for variations in the thickness of the disc and variations the surface level of the disc, including link means for varying the elasticity of the gimbal plate means between at least two directions, the link means having at least four links in one direction for reducing stress on the gimbal plate means and increasing the allowable degree of variation in elasticity between the two directions.

The gimbal plate means allows a head pressing force which is set to different values or elasticity for the pitching direction and elasticity for the rolling direction.

Namely, the magnetic disc device of the present invention has a gimbal unit which includes magnetic heads that are arranged facing each other on opposite sides of a flexible magnetic disc to carry out recording and reproducing with respect to the disc. An arm is substantially fixed to a carriage which is movable in the radial direction of the magnetic disc, and a head pressing means connects the magnetic heads to the arm and supplies a pressing force on the magnetic heads. In this device, the gimbal unit is constructed from an islandlike head fixing portion, which fixes the magnetic heads, an intermediate gimbal which is arranged in the periphery of the fixing portion, and bridgelike linking portions which link the intermediate gimbal respectively to the head fixing portion and the arm. The shape of the bridgelike linking portions is arranged to be set appropriately so as to substantially optimize the elasticities in the two directions of the running direction of the heads and the radial direction, which is perpendicular to the head running direction of the rotating disc.

With the above configuration, elasticity in the pitching direction and elasticity in the rolling direction can be substantially optimized. With this arrangement, it becomes possible to set the rotational elasticity to the lowest value possible, and accordingly to reduce the head pressing load. The head pressing load has a positive correlation with the elasticities in the two directions of rotation. Thus, for instance, the head load can be reduced if the elasticity in the pitching direction is small even when the elasticity in the rolling direction is increased to reduce the frequency of offtrack operation.

BRIEF DESCRIPTION OF THE DRAWINGS

The accompanying drawings, which are incorporated in and constitute a part of the specification, illustrate several embodiments of the invention, and, together with the description, serve to explain the principles of the invention.

Of the drawings.

DETAILED DESCRIPTION OF THE PREFERRED EMBODIMENTS

Reference will now be made in detail to the present preferred embodiment of the invention, examples of which are illustrated in the accompanying drawings.

Figure 1:
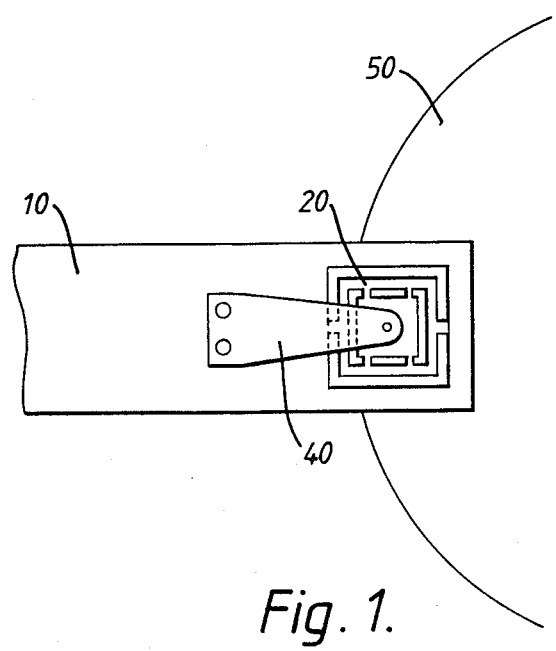
FIG. 1 is a plan view which shows the important construction of the magnetic disc device in accordance with an embodiment of the present invention.
Figure 2:
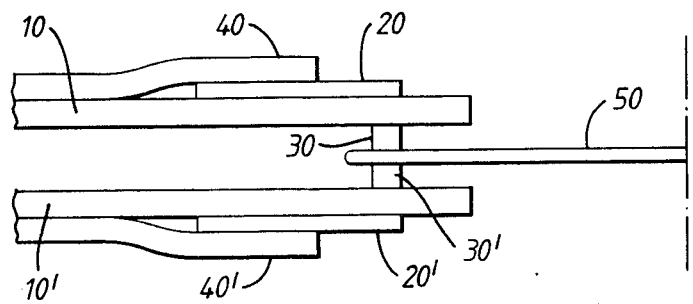
FIG. 2 is a side view of the device of FIG. 1.

FIG. 1 is a side view which shows the major components of a magnetic disc device in accordance with an embodiment of the present invention, and FIG. 2 is its front view. In the figures, 10 is a fixed arm, and a gimbal 20 is connected to the arm 10. At the central part on the bottom surface of the gimbal 20 a magnetic head 30 is mounted. Further, on the top surface of the arm 10 there is fixed a head pressing spring portion 40 whose free end makes contact with the central part of the top surface of the gimbal 20. By the head pressing spring portion 40, the magnetic head 30 is biased downward and makes contact with a magnetic disc 50. Further, opposite to the head 30 on the other side of the magnetic disc 50, a fixed arm 10', a gimbal 20', a magnetic head 30', and a head pressing spring portion 40' are mounted.

The fixed arm 10 is moved upward when the magnetic disc 50 is inserted, and the arms 10 and 10' are fixed to a carriage which is not shown. Further, the gimbals 20 and 20' are formed with thin plate materials such as stainless steel, copper alloy, or the like.

Figure 3:
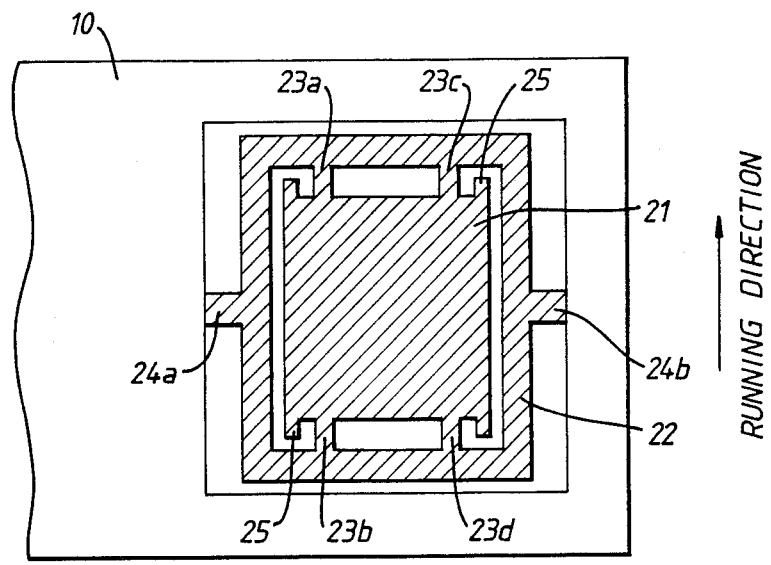
FIG. 3 is a plan view which shows an enlargement of the configuration of the gimbal portion of the device of FIG. 1.

In FIG. 3 is shown an enlarged plan view of gimbal 20. The gimbal 20 includes an islandlike head fixing portion 21 for fixing the magnetic head 30, an intermediate gimbal portion 22 that is located at the periphery of the fixing portion 21, bridgelike linking portions 23 and 24 that link the intermediate gimbal portion 22 and the fixing portion 21. The bridgelike linking portion 23 is arranged between the head fixing portion 21 and the intermediate gimbal portion 22 along the running direction of the magnetic head and includes two link sets 23a, 23b, 23c, and 23d positioned symmetrically. Another bridgelike linking portion is arranged between the intermediate gimbal portion 22 and the fixing arm 10 along the radial direction of the magnetic disc that is perpendicular to the running direction of the magnetic head and includes one set of links 24a and 24b, to provide elasticity in the pitching direction.

Accordingly, elasticity in the rolling direction can be defined approximately as the product of the elasticity in the updown direction of the two pairs of the bridgelike linking portions 23a, 23b and 23c, 23d and the square of the distance 1 between the pairs of linking portions. As a result, it is possible to reduce the error (off-track) which is generated by rolling rotation. The elasticity in the pitching direction is defined by the set of bridgelike linking portions 24a and 24b, so that it is approximately equal to the rotational elasticity of the linking portion, which is small. Since the elasticity in the rolling direction can be made large and the elasticity in the pitching direction can be made small, it is possible to reduce the head pressing load. This has a positive correlation with the sum of the rotational rigidities. At the same time, the off-track, which has an inverse correlation with the elasticity in the rolling direction, can be kept at a low level. Further, the head pressing load is provided by another spring portion 40, so that it is possible to use a gimbal of smaller size.

The magnetic head 30 is flexibly supported in the up-down direction and in the two directions of rotation via the gimbal portion 20 and the head pressing spring portion 40. Because of this, the magnetic head 30 also moves up and down in response to the distortion of the magnetic disc 50, so that contact between the magnetic head 30 and the magnetic disc 50 will not be lost even if the elasticity of the magnetic disc 50 is increased. Moreover, the positional accuracy in the up and down directions of the magnetic head 30 will not be affected too much, since the position of the magnetic head 30 is determined in response to the position of the magnetic disc 50.

In addition, even if the parallelism of the two magnetic heads 30 and 30' is unsatisfactory, a satisfactory contact can be obtained between the magnetic head 30 and the magnetic disc 50 through an elastic deformation in the flexible gimbal portion 20 under a small pressing load. Since the head pressing load is provided by the elasticity of the head pressing spring portion 40, the arm 10, to which is attached the supporting portion of the magnetic head, may be fixed. If the arm 10 is fixed, rigidity can be increased and the vibration resistance can be improved. As a result, a satisfactory contact between the magnetic head and the magnetic disc can be obtained even under a small pressing load and positional accuracy in the up and down direction, and, hence, the durability and the vibration resistance of the magnetic disc, can be improved.

Further, a damper fixing gimbal portion 25 is provided at the four corners of the islandlike head fixing portion 21 to provide a damping force to the magnetic head 30. The fixing portion 21 is linked to the fixed arm 10 with rubber dampers or the like.

As in the above, according to the present embodiment, the bridgelike linking portions include two pairs in the running direction of the magnetic head and one pair in the radial direction of the magnetic disc, which is perpendicular to the running direction of the magnetic head. Accordingly, it is possible to make the elasticity in the rolling direction larger than the elasticity in the pitching direction. Therefore, it is possible to better optimize the elasticity in the rotational direction for magnetic discs that require the elasticity in the rolling direction to be larger than the elasticity in the pitching direction. In addition, the head pressing load can be reduced. Accordingly, a satisfactory contact of the head with the magnetic disc and an improvement in the durability of the magnetic disc can be accomplished without placing an undue load on the magnetic disc. In addition arm 10 may be fixed so that further improvements in vibrational resistance can be realized. Further, it is easier to manufacture the device of the invention due to increases in the tolerance of the mounting accuracy of the magnetic head.

Figure 4:
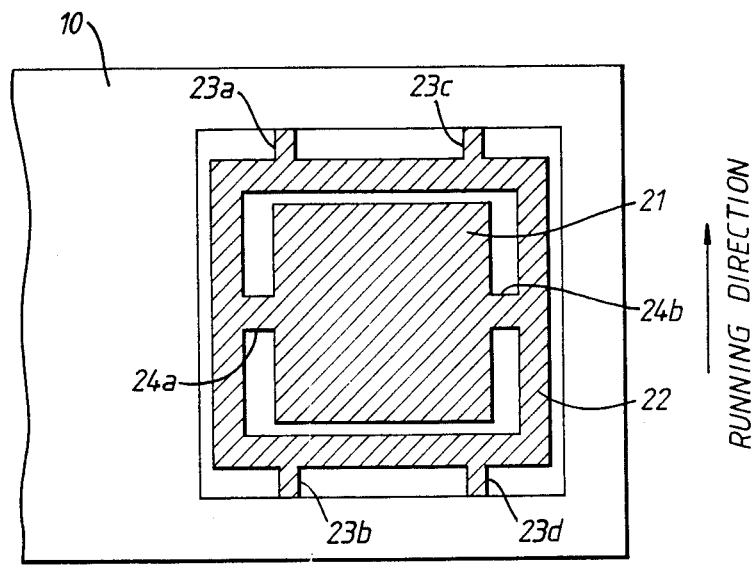
FIG. 4, FIG. 5, and FIG. 6 are plan views that show the configuration of the gimbal portion of other embodiments of the present invention.

FIG. 4 is a plan view which illustrates the configuration of another embodiment of the present invention. The portions that are the same as in FIG. 3 were given identical symbols and their description is omitted.

The difference of this embodiment from the embodiment described above is in the mounting positions of the bridgelike linking portions. Namely, the bridgelike linking portions 23a-d are arranged between the fixed arm 10 and the intermediate gimbal portion 22, and the bridgelike linking portion 24a, 24b are arranged between the intermediate gimbal portion 22 and the head fixing portion 21. Needless to say, effects similar to those for the foregoing embodiment can be obtained with a configuration such as this.

It should be mentioned that the present invention is not at all limited to the embodiments described in the foregoing. Thus, for example, the number of the bridgelike linking portions need not be limited to two pairs, and may be arranged in sets of three or more. Moreover, for some kinds of magnetic discs, it is necessary to have rigidity in the pitching direction larger than the rigidity in the rolling direction. In such a case, one needs only to interchange the number of arranged bridgelike linking portions in the running direction of the magnetic head with the number in the radial direction, which is perpendicular to the running direction of the magnetic disc.

Figure 5:
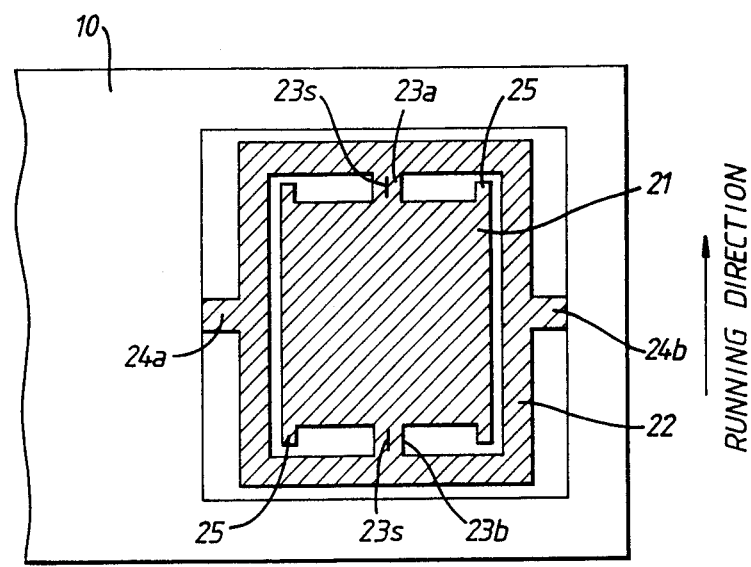
Figure 6:
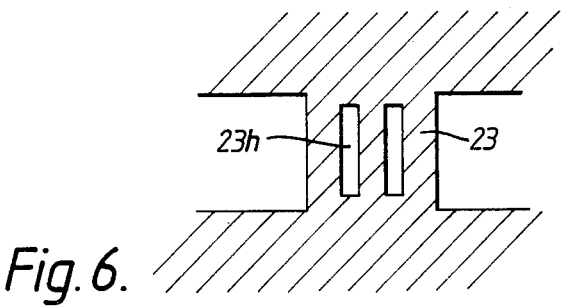

In addition, as shown in FIG. 5, one set 23a and 23b of bridgelike linking portions may be formed in the running direction of the magnetic head, increasing the elasticity in the rolling direction by widening the width of the bridgelike linking portion 23a and 23b to some extent, and by supplying the elasticity in the pitching direction by a slit 23s or an opening 23h, as shown in FIG. 6. Further, instead of providing a head pressing portion 40 in addition to the gimbal portion 20, the function of pressing the magnetic disc by the magnetic head may be assigned directly to the gimbal portion 20.

Various modifications could obviously be made in the invention without departing from the scope of spirit of the invention.

What is claimed is:

1. A magnetic recording device for recording and reproducing data on a magnetic disc, comprising:
   a magnetic head for contacting the magnetic disc and for reading and writing data on the magnetic disc;
   means for rotatably supporting the magnetic disc for contact with said magnetic head; and
   gimbal plate means flexibly supporting the head for movement in two directions of rotation with respect to the magnetic disc and for compensating for variations in the thickness and surface level of the disc, said gimbal plate means structured to include link means constructed and positioned to provide distinct degrees of elasticity of said gimbal plate means in said two directions of rotation, said link means including at least six links in one direction of rotation to reduce elasticity in one of said two directions of rotation and to increase elasticity in the other of said two directions of rotation;
   said gimbal plate means includes a support arm having a flexible gimbal portion mounted thereon, said magnetic head being mounted on said flexible gimbal portion;
   said gimbal portion includes a head fixing portion and an intermediate gimbal portion located about the periphery of said head fixing portion, said intermediate gimbal portion being flexibly attached to said support arm; and
   said six links symmetrically arranged in at least a pair of links on opposite sides of said head fixing portion for connecting said head fixing portion to said intermediate gimbal portion, and said link means including at least two pairs of links in the other direction located on opposite sides of said intermediate gimbal portion for connecting said intermediate gimbal portion to said support arm.

2. A magnetic device according to claim 1, wherein said gimbal plate means includes means for biasing said magnetic head against the magnetic disc.

3. A magnetic device according to claim 2, further comprising a second magnetic head for contacting the magnetic disc on the opposite side from the magnetic head.

4. A magnetic device according to claim 1, wherein said flexible gimbal portion includes a thin plate material.

5. A magnetic device according to claim 4, wherein said thin plate material is formed from stainless steel.

6. A magnetic device according to claim 4, wherein said thin plate material is formed from a copper alloy.

* * * * *